United States Patent
Yamazaki (10) Patent No.: US 12,084,053 B2
(45) Date of Patent: Sep. 10, 2024

(54) DEVICE AND METHOD FOR OPTIMAL LANE KEEPING ASSISTANCE, ARTICULATED VEHICLE, COMPUTER PROGRAM, AND COMPUTER READABLE MEDIUM STORING COMPUTER PROGRAM

(71) Applicant: Hiroo Yamazaki, Saitama (JP)

(72) Inventor: Hiroo Yamazaki, Saitama (JP)

(73) Assignee: VOLVO TRUCK CORPORATION, Gothenburg (SE)

( * ) Notice: Subject to any disclaimer, the term of this patent is extended or adjusted under 35 U.S.C. 154(b) by 173 days.

(21) Appl. No.: 17/634,821

(22) PCT Filed: Aug. 14, 2019

(86) PCT No.: PCT/JP2019/031958
§ 371 (c)(1),
(2) Date: Feb. 11, 2022

(87) PCT Pub. No.: WO2021/029041
PCT Pub. Date: Feb. 18, 2021

(65) Prior Publication Data
US 2022/0324445 A1    Oct. 13, 2022

(51) Int. Cl.
*B60W 30/12* (2020.01)
*B60W 10/20* (2006.01)
(Continued)

(52) U.S. Cl.
CPC ............ *B60W 30/12* (2013.01); *B60W 10/20* (2013.01); *B60W 40/114* (2013.01);
(Continued)

(58) Field of Classification Search
CPC .... B60W 30/12; B60W 10/20; B60W 40/114; B60W 50/0098; B60W 2050/0008;
(Continued)

(56) References Cited

U.S. PATENT DOCUMENTS

| 5,579,228 A | 11/1996 | Kimbrough et al. |
| 2017/0247054 A1* | 8/2017 | Lee ................... B62D 15/029 |

(Continued)

FOREIGN PATENT DOCUMENTS

| EP | 2426034 A2 | 3/2012 |
| EP | 2858879 A1 | 4/2015 |

(Continued)

OTHER PUBLICATIONS

Yang et al., Development of a Unified Lane-Keeping and Collision Avoidance System for Semi-Trailer Truck, Aug. 25, 2020, IEEE Access, pp. 149751-149763, (Year: 2020).*

(Continued)

*Primary Examiner* — Sze-Hon Kong
(74) *Attorney, Agent, or Firm* — Venable LLP; Jeffri A. Kaminski (57) ABSTRACT

An optimal lane keeping assistance device of an articulated vehicle (100), in which a tractor (200) and a trailer (300) are connected via a fifth wheel coupling (400), includes a first sensor (520,540) which detects a tractor state variable, a second sensor (560) which detects a fifth wheel coupling (400) state variable, and an electric control unit (500) incorporating a microcomputer. The electric control unit (500) calculates a control variable (Uc) according to a target lateral displacement value (Yd), an output signal of the first sensor (520, 540), and an output signal of the second sensor (560), taking into account a feedback gain of an optimal control rule, to calculate a target steering angle ($\delta f$) of the tractor (200) according to the calculated control variable (Uc) and the output signal of the first sensor (520,540), and to assist steering of the tractor (200) based on the calculated target steering angle ($\delta f$).

12 Claims, 6 Drawing Sheets

(51) Int. Cl.
  *B60W 40/114* (2012.01)
  *B60W 50/00* (2006.01)
  *B62D 6/00* (2006.01)
  *B62D 13/00* (2006.01)
  *B62D 15/02* (2006.01)

(52) U.S. Cl.
  CPC ......... *B60W 50/0098* (2013.01); *B62D 6/005* (2013.01); *B62D 13/005* (2013.01); *B62D 15/021* (2013.01); *B62D 15/025* (2013.01); *B60W 2050/0008* (2013.01); *B60W 2300/145* (2013.01); *B60W 2520/14* (2013.01); *B60W 2540/18* (2013.01); *B60W 2710/207* (2013.01)

(58) Field of Classification Search
  CPC ....... B60W 2300/145; B60W 2520/14; B60W 2540/18; B60W 2710/207; B62D 6/005; B62D 13/005; B62D 15/021; B62D 15/025
  See application file for complete search history.

(56) References Cited

U.S. PATENT DOCUMENTS

2019/0299947 A1* 10/2019 Higashitani ............... B60T 7/22
2020/0001920 A1* 1/2020 Hejase ............ B60W 30/18036
2020/0142405 A1* 5/2020 Havens ................ G05D 1/0212
2020/0324763 A1* 10/2020 Switkes ................ G08G 1/161

FOREIGN PATENT DOCUMENTS

| JP | 2011068248 A | 4/2011 |
|---|---|---|
| JP | 4855544 B2 | 1/2012 |
| JP | 016155491 A | 9/2016 |
| WO | 2013187825 A1 | 12/2013 |

OTHER PUBLICATIONS

Pushkar et al., Lateral Control of Heavy Duty Vehicles for Automated Highway System: Experimental Study on a Tractor Semitrailer, Jan. 2000, California PATH Worker Paper, All pages (Year: 2000).*

Hiroi, Kazuo, pp. 28-31, [online], Jul. 27, 2005 [Retrieved on Sep. 17, 2019], ( Japan Industrial Publishing Co., Ltd), Retrieved from Internet: <https://www.nikko-pb.co.jp/products/k_data/28P_31P_13.pdf>.

International Search Report and Written Opinion dated Oct. 8, 2019 in corresponding International PCT Application No. PCT/JP2019/031958, 11 pages.

European Search Report dated Mar. 24, 2023 in corresponding European Patent Application No. 19941731.2, 10 pages.

* cited by examiner

DEVICE AND METHOD FOR OPTIMAL LANE KEEPING ASSISTANCE, ARTICULATED VEHICLE, COMPUTER PROGRAM, AND COMPUTER READABLE MEDIUM STORING COMPUTER PROGRAM

CROSS-REFERENCE TO RELATED APPLICATIONS

This application is a U.S. National Stage application of PCT/JP2019/031958, filed Aug. 14, 2019 and published on Feb. 18, 2021, as WO 2021/029041 A1, all of which is hereby incorporated by reference in its entirety.

TECHNICAL FIELD

The present invention relates to optimal lane keeping assistance devices and optimum lane keeping assistance methods for maintaining an articulated vehicle in a lane. Furthermore, the present invention relates to articulated vehicles provided with optimal lane keeping assistance devices, computer programs for executing the optimum lane keeping assistance methods, and computer readable mediums storing the computer program.

BACKGROUND ART

Conventionally, as disclosed in JP 2011-68248 A (Patent Literature 1), in order to improve running stability of an articulated vehicle, in which a tractor and a trailer are connected, techniques for applying braking force to one of the left and right sides of a tractor based on lateral acceleration, yaw rate, running speed, and steering angle of the tractor, have been proposed.

CITATION LIST

Patent Literature

PTL 1: JP 2011-68248 A

SUMMARY OF INVENTION

Technical Problem

However, in the techniques disclosed in Patent Literature 1, it is not assumed that a tire burst, punctures, and the like occur, thereby reducing cornering power, and thus, it is difficult to ensure stability of the articulated vehicle in a state in which an abnormality occurs in a tractor or trailer tire.

Therefore, an object of the present invention is to provide an optimal lane keeping assistance device and an optimum lane keeping assistance method that can ensure the stability of the articulated vehicle, even when an abnormality occurs in a tire of an articulated vehicle, in which a tractor and a trailer are connected. Furthermore, an object of the present invention is to further provide a vehicle equipped with an optimal lane keeping assistance device, a computer program for executing the optimal lane keeping assistance method, and a computer readable medium for storing the computer program.

Solution to Problem

According to one embodiment of the present invention, there is provided an optimal lane keeping assistance device of an articulated vehicle, in which a tractor and a trailer are connected via a fifth wheel coupling. The optimal lane keeping assistance device includes a first sensor which detects a tractor state variable, a second sensor which detects a fifth wheel coupling state variable, and an electric control unit incorporating a microcomputer. The electric control unit calculates a control variable according to a target lateral displacement value, an output signal of the first sensor, and an output signal of the second sensor, taking into account a feedback gain of an optimal control rule, to calculate a target steering angle of the tractor according to the calculated control variable and the output signal of the first sensor, and to assist steering of the tractor based on the calculated target steering angle.

According to another embodiment of the present invention, there is provided an optimal lane keeping assistance method for an articulated vehicle, in which a tractor and a trailer are connected via a fifth wheel coupling, and the articulated vehicle includes: a first sensor which detects a state variable of the tractor; a second sensor which detects a state variable of the fifth wheel coupling; and an electric control unit incorporating a microcomputer. The electric control unit performs the following steps: calculating a control variable according to the target lateral displacement value and output signals from the first sensor and the second sensor, taking into account a feedback gain of the optimal control rule; calculating a target steering angle of the tractor according to the calculated control variable and the output signal of the first sensor; and assisting steering of the tractor based on the calculated target steering angle.

According to an embodiment of the present invention, an articulated vehicle having an optimal lane keeping assistance device is provided. Furthermore, according to another embodiment of the present invention, there is provided a computer program including a program code which executes the steps of the optimal lane keeping assistance method when the computer program is executed on a computer, and a computer readable medium storing the computer program.

Advantageous Effects of Invention

According to the present invention, it is possible to ensure the stability of the articulated vehicle even if an abnormality occurs in a tire of the articulated vehicle, in which a tractor and a trailer are connected.

DESCRIPTION OF EMBODIMENTS

Figure 1:
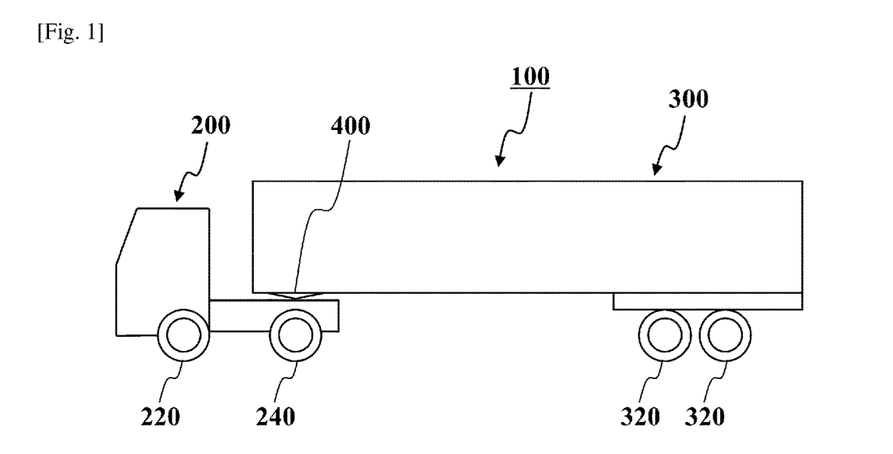
FIG. 1 is a side view of an example of the articulated vehicle, in which a tractor and a trailer are connected.

Hereinafter, embodiments implementing the present invention will be described in detail with reference to the attached drawings. FIG. 1 illustrates an example of an articulated vehicle 100 which can be applied to the present embodiment. The articulated vehicle 100 illustrated in FIG. 1 is a semi-trailer vehicle, and specifically, a tractor 200 and a trailer 300 are connected in the articulated vehicle 100 via a fifth wheel coupling 400. The articulated vehicle 100 is not limited to the semi-trailer vehicle, but may be a full trailer vehicle or the like.

The tractor 200 includes a front wheel 220 capable of steering by an electric power steering device, and a rear wheel 240 driven by a diesel engine or the like. Here, as the rear wheel 240, a double tire in which two tires are arranged in parallel can be used. Furthermore, on the rear side of the trailer 300, rear double-tire wheels 320 on two axles are attached. The fifth wheel coupling 400 includes a coupler fixed to an upper surface of the mar of the tractor 200 and a king pin fixed to a lower surface of the front of the trailer 300. In a state in which the king pin of the trailer 300 is detachably connected to the coupler of the tractor 200, the fifth wheel coupling 400 is allowed to rotate around a rotation shaft extending in the vertical direction with respect to the tractor 200.

Figure 2:
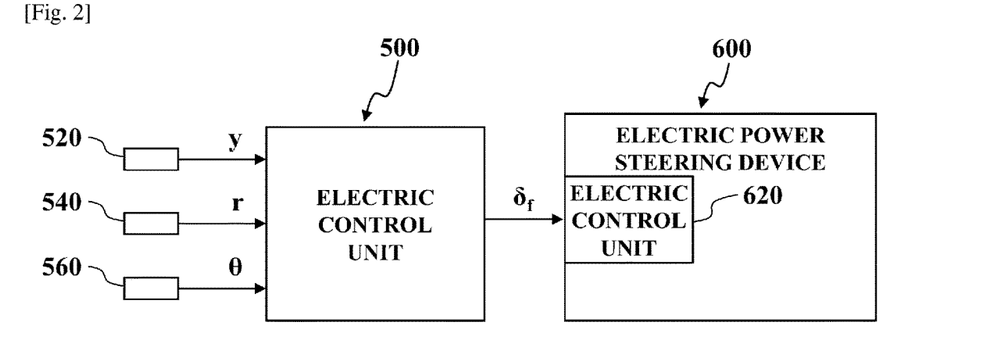
FIG. 2 is a configuration view of an example of an electronic control system mounted in the tractor.
Figure 3:
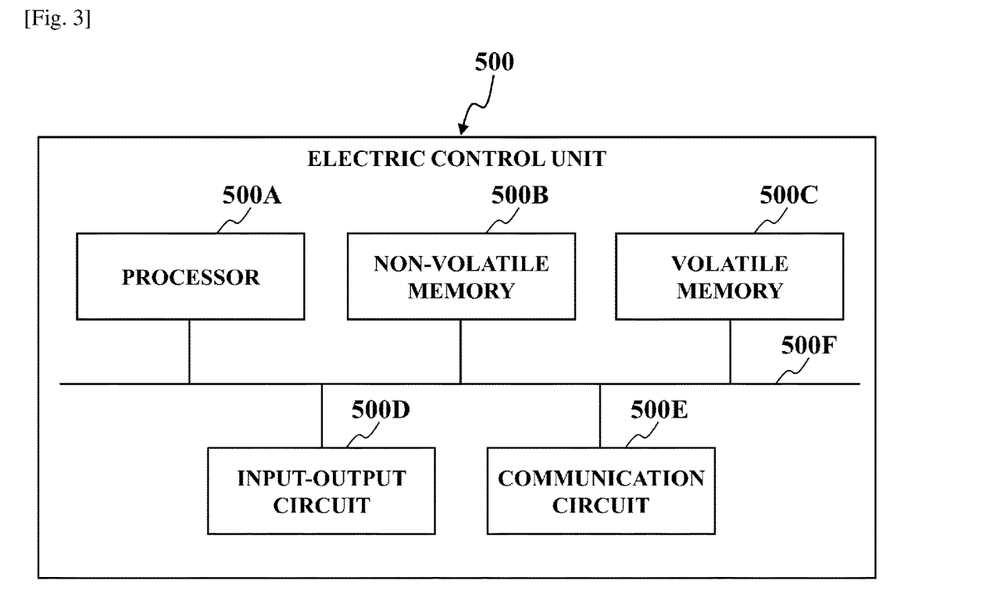
FIG. 3 is an internal structural view of an example of an electric control unit.

As illustrated in FIG. 2, an electric control unit 500 having a built-in microcomputer is mounted at a predetermined location of the tractor 200. As illustrated in FIG. 3, the electric control unit 500 includes a processor 500A such as a central processing unit (CPU), a non-volatile memory 500B, a volatile memory 500C, an input-output circuit 500D, and a communication circuit 500E, and an internal bus 500F for communicably connecting with each other.

The processor 500A is hardware that executes an instruction set (data transfer, operation, processing, control, management, and the like) described in an application program, and includes an arithmetic unit, registers for storing instructions and data, peripheral circuits, and the like. The non-volatile memory 500B includes, for example, a flash ROM (read-only memory), which is capable of storing data even when power supply is shut off, and the non-volatile memory 500B stores therein an application program (computer program) for implementing the optimal lane keeping assistance device. The volatile memory 500C includes a dynamic RAM (random access memory) or the like that loses data when the power supply is shut off, and provides a storage area for temporarily storing data in the calculation process of the processor 500A.

The input-output circuit 500D includes an A/D converter, a D/A converter, a D/D converter, and the like, and provides an input-output function of analog signals and digital signals to/from external devices. The communication circuit 500E includes, for example, a CAN (controller area network) transceiver or the like, and provides a function of connecting to an in-vehicle network. The internal bus 500F is a path for exchanging data between devices, and includes: an address bus for transferring an address; a data bus for transferring data; and a control bus which exchanges: a timing at which input and output are performed in the address bus and the data bus; and control information.

To a predetermined location of the tractor 200, a lateral displacement sensor 520 for detecting lateral displacement value y [m], a yaw rate sensor 540 for detecting yaw rate r [rad/s], are respectively attached. Here, the lateral displacement sensor 520 is formed, for example, of a stereo camera that captures the front situation of the tractor 200, and detects the displacement (deviation) from a reference point which is the center of the lane (traffic lane) at the forward gazing distance Lp [m] of the tractor 200. In addition, a connecting angle sensor 560 for detecting a connecting angle θ [rad] of the trailer 300 with respect to the longitudinal axis of the tractor 200 is attached to a predetermined position of the fifth wheel coupling 400 fixed to the upper surface of the rear of the tractor 200. The lateral displacement sensor 520 and the yaw rate sensor 540 are mentioned as an example of the first sensor which detects the state variable of tractor 200, and the connecting angle sensor 560 is an example of the second sensor which detects the state variable of the fifth wheel coupling 400.

The processor 500A of the electric control unit 500 receives output signals of the lateral displacement sensor 520, the yaw rate sensor 540, and the connecting angle sensor 560 via the input-output circuit 500D and the internal bus 500F. The processor 500A of the electric control unit 500 executes the application program stored in the non-volatile memory 500B, so that a target steering angle $\delta_f$ [rad] is transmitted to an electric control unit 620 of an electric power steering device 600 according to a target lateral displacement value $Y_d$ [m] and each output signal of: the lateral displacement sensor 520; the yaw rate sensor 540; and the connecting angle sensor 560, to assist steering of the tractor 200. The target lateral displacement value $Y_d$ is given, for example, by a known function of the optimal lane keeping assistance device.

Here, an outline of the optimum lane keeping assistance process executed by the processor 500A of the electric control unit 500 according to the application program will be described. The processor 500A of the electric control unit 500 integrates the output signal of the yaw rate sensor 540 to calculate the yaw angle Ψ [rad] of the tractor 200, and to calculate a connecting angular velocity ω [rad/s] based on the temporal variable of the output signal of the connecting angle sensor 560. Thus, the processor 500A of the electronic control device 500 is an example of the first sensor detecting the state variable of the tractor 200 and the second sensor detecting the state variable of the fifth wheel coupling 400. The yaw angle Ψ of the tractor 200 and the connecting angular velocity ω of the fifth wheel coupling 400 may be directly detected using a known sensor.

The processor 500A of the electric control unit 500 calculates a control variable $u_c$ [m] according to the target lateral displacement value $Y_d$, the state variable of the tractor 200 and the state variable of the fifth wheel coupling 400 taking into account the feedback gain F of the optimal control rule. Furthermore, the processor 500A of the electric control unit 500 calculates the target steering angle $\delta_f$ of the tractor 200 according to the calculated control variable $u_c$ and the state variable of the tractor 200. Then, the processor 500A of the electric control unit 500 outputs the target steering angle $\delta_f$ to the electric control unit 620 of the electric power steering device 600, thereby assisting the steering of the tractor 200 so as to be the target lateral displacement value $Y_d$.

Here, prior to describing the specific optimum lane keeping assistance process, the theoretical development of how to calculate the target steering angle $\delta_f$ and how to obtain the optimal control rule will be described. First, an analysis model of the articulated vehicle 100, which is a semi-trailer vehicle, will be discussed.

As a parameter of the tractor 200 in the analysis model of the articulated vehicle 100, assume that the distance between gravitational center and the front wheel 220 is a [m], the distance between the gravitational center and the fifth wheel coupling 400 is $a_1$ [m], the distance between the gravitational center and the rear wheel 240 is b [m], a wheelbase is $l_1(a_1+b)$ [m], mass is m [kg], yaw moment of inertia is $I_z$ [kgm$^2$], cornering power of the front wheel 240 is $C_f$ [N/rad], cornering power of the rear wheel 240 is $C_r$ [N/rad], lateral velocity of the gravitational center is v [m/s], the front wheel steering angle is $\delta_f$ [rad], and yaw rate is r [rad/s]. In addition, as a parameter of the trailer 300 in the analysis model of the articulated vehicle 100, assume that the distance between gravitational center and the fifth wheel coupling 400 is c [m], the mass is $m_1$ [kg], the yaw moment of inertia is $I_1$ [kgm$^2$], and cornering power is $C_1$ [N/rad]. Furthermore, as a parameter of the fifth wheel coupling 400 in the analysis model of the articulated vehicle 100, assume that the connecting angular velocity is $\omega$ [rad/s], the connecting angle is $\theta$ [rad], and a longitudinal velocity of the articulated vehicle 100 in the analysis model of the articulated vehicle 100 is u [m/s]. Then, a state equation representing the motion of the articulated vehicle 100 may be expressed as follows:

$$\frac{d}{dt}x = M^{-1}A_0 x + M^{-1}B_0 \delta_f$$

$$x = [\begin{matrix} v & r & \omega & \theta \end{matrix}]^T$$

$$\theta = \varphi - \varphi'$$

$$\omega = \dot{\theta}$$

$$M^{-1} = \begin{bmatrix} m+m_1 & -m_1(a_1+c) & m_1 a_1 & 0 \\ mc & I_z & 0 & 0 \\ m_1 a_1 & -I_1 - m_1 a_1(a_1+c) & I_1 + m_1 a_1^2 & 0 \\ 0 & 0 & 0 & 1 \end{bmatrix}^{-1}$$

$$A_0 = \begin{bmatrix} -\frac{C_f + C_r + C_1}{u} & -(m+m_1)u - \frac{(a(a+c)C_r - bC_r - (c+l_1)C_1)}{(u)} & -\frac{l_1 C_1}{u} & -C_1 \\ -\frac{(C_f(a+c) + C_r(c-b))}{(u)} & -mcu - \frac{a(a+c)C_f - b(c-b)C_r}{u} & 0 & 0 \\ -\frac{C_1 l_1}{u} & -m_1 a_1 u + \frac{C_1 l_1 (l_1 + c)}{u} & -\frac{C_1 l_1^2}{u} & -l_1 C_1 \\ 0 & 0 & 1 & 0 \end{bmatrix}$$

$$B_0 = \begin{bmatrix} C_f \\ (a+c)C_f \\ 0 \\ 0 \end{bmatrix},$$

[Math. 1]

where x is a state variable, $M^{-1}$ is an inverse mass matrix, $A_0$ is an attenuation matrix, and $B_0$ is an external force matrix.

A model representing the driver's steering may be expressed as follows by applying the forward gazing model to the above equation:

$$\frac{d\delta_f}{dt} = -\frac{1}{T_s}\delta_f + \frac{G}{T_s}e,$$

[Math. 2]

where $T_s$ is a time constant [s] of the driver model, G is a steering gain, and e is an error [m] representing a deviation from the target lateral displacement value $Y_d$.

Since the equation of motion described above is a differential equation of a continuous-time system, the processor 500A of the electric control unit 500 cannot calculate the equation. For this reason, the equation of motion should be transformed into an equation of a discrete-time system. A system matrix of discrete-time system Ad and a control matrix in discreate-time system Bd give the following difference equation:

$$x(k+1) = A_d x(k) + B_d u(k)$$

$$y(k) = Cx(k)$$

$$A_d = I + AT + \frac{1}{2!}(AT)^2 + \ldots + \frac{1}{N!}(AT)^N$$

$$E_d = I + \frac{1}{2!}AT + \frac{1}{3!}(AT)^2 + \ldots + \frac{1}{N!}(AT)^{N-1}$$

$$B_d = E_d TB,$$

[Math. 3]

where T [s] is a sampling time, $A = M^{-1}A_0$ is system matrix in continuous time system, $B = M^{-1}B_0$ is control matrix in continuous time system, C is an observation matrix, and I is an identity matrix.

By applying the difference equation obtained in this manner to the driver model, it is possible to obtain a discrete-time equation for calculating the target steering angle $\delta_f$ as shown in the following equation.

$$\delta(k+1) = a_d \delta(k) + b_d e(k)$$

[Math. 4]

$$a_d = 1 + \left(-\frac{1}{T_s}T\right) + \frac{1}{2!}\left(-\frac{1}{T_s}T\right)^2 + \ldots + \frac{1}{N!}\left(-\frac{1}{T_s}T\right)^N$$

$$e_d = 1 + \frac{1}{2!}\left(-\frac{1}{T_s}T\right) + \frac{1}{3!}\left(-\frac{1}{T_s}T\right)^2 + \ldots + \frac{1}{N!}\left(-\frac{1}{T_s}T\right)^{N-1}$$

$$b_d = e_d T \frac{G}{T_s}$$

In a system represented by the above difference equation, when the feedback gain is F, a control variable $u_C$ which represents an optimal control rule, is defined by the following equation.

$$u_c = Y_d - Fx(k) \qquad \text{[Math.5]}$$

The feedback gain F can be determined by obtaining a disturbance variance matrix Q and an observed noise variance matrix R which minimize the following equation.

$$J = \frac{1}{2}\sum_{k=0}^{\infty}\{x(k)^T Qx(k) + Ru(k)^2\} \qquad \text{[Math. 6]}$$

Here, the feedback gain F is expressed as follows:

$$F = (R + B_d^T P B_d)^{-1} B_d^T P A_d \qquad \text{[Math.7]}$$

Here, in the above equation representing the feedback gain F, P is a solution for the Riccati equation represented as follows:

$$P = Q + A_d^T P A_d - A_d^T P B_d (R + B^T P B)^{-1} B^T P A_d \qquad \text{[Math.8]}$$

Figure 4:
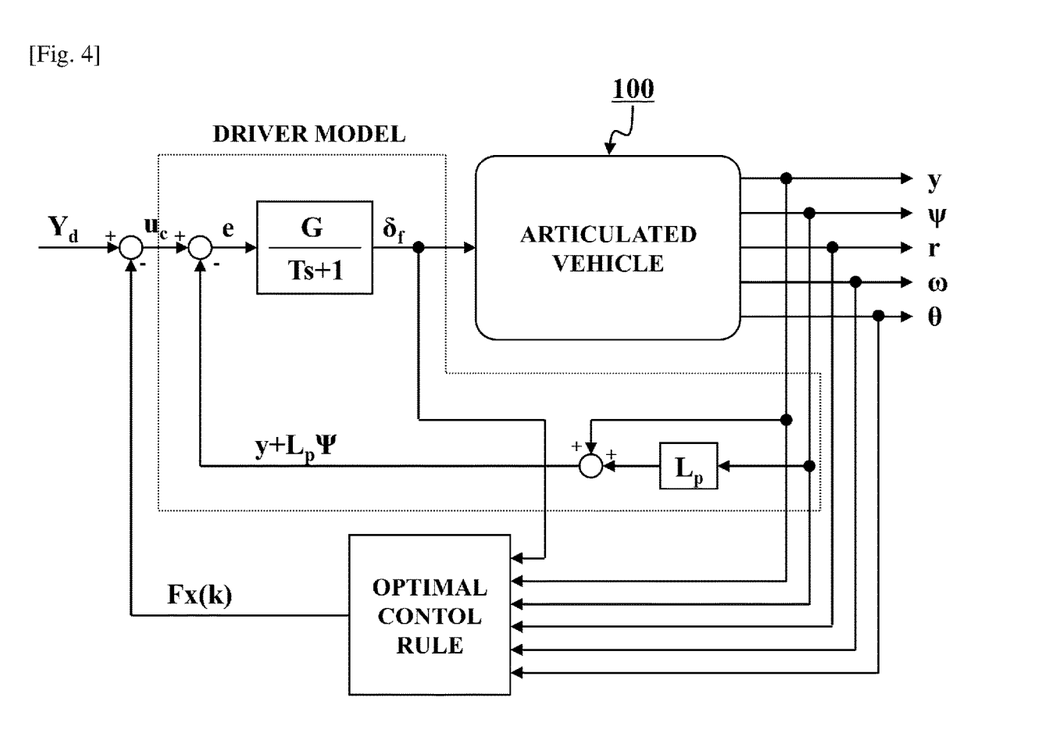
FIG. 4 is a control block view of an optimal lane keeping assistance process.

FIG. 4 illustrates a control block of the optimal lane keeping assistance process implemented by the processor 500A of the electric control unit 500 mounted on the tractor 200. When x (k) is the state variable of the articulated vehicle 100, the lateral displacement value y, the yaw angle $\Psi$ and the yaw rate r of the tractor 200, and the connecting angular velocity $\omega$ and the connecting angle $\theta$ of the fifth wheel coupling 400 are multiplied by the feedback gain F of the optimal control rule so as to obtain Fx(k). The obtained Fx(k) is subtracted from the target lateral displacement value $Y_d$ to obtain the control variable $u_c = Y_d - Fx(k)$. Furthermore, to the lateral displacement value y of the tractor 200, a value ($L_p W$) obtained by multiplying the front gazing distance Lp by the yaw angle $\Psi$ of the tractor 200 is added, so that $(y + L_p \Psi)$ is obtained.

Then, by subtracting $(y + L_p \Psi)$ from the control variable $u_c(Y_d - Fx(k))$, an error e ($Y_d - Fx(k) - y - L_p \Psi$) representing the deviation from the target lateral displacement value $Y_d$ is obtained. The obtained error e is multiplied by a constant $(G/(T_s+1))$ obtained by dividing the steering gain G by the value obtained by adding 1 to the time constant $T_s$ of the driver model, taking into consideration the driver model of a first order lag system, so that the target steering angle $\delta_f$ of the tractor 200 is obtained. The target steering angle $\delta_f$ is taken into consideration when applying the optimal control rule and is transmit to the electric control unit 620 of the electric power steering device 600 to assist the steering of the tractor 200. Accordingly, the tractor 200 can be steered to travel in the center of a lane located in front of the articulated vehicle 100 to thereby suppress lane departure.

Figure 5:
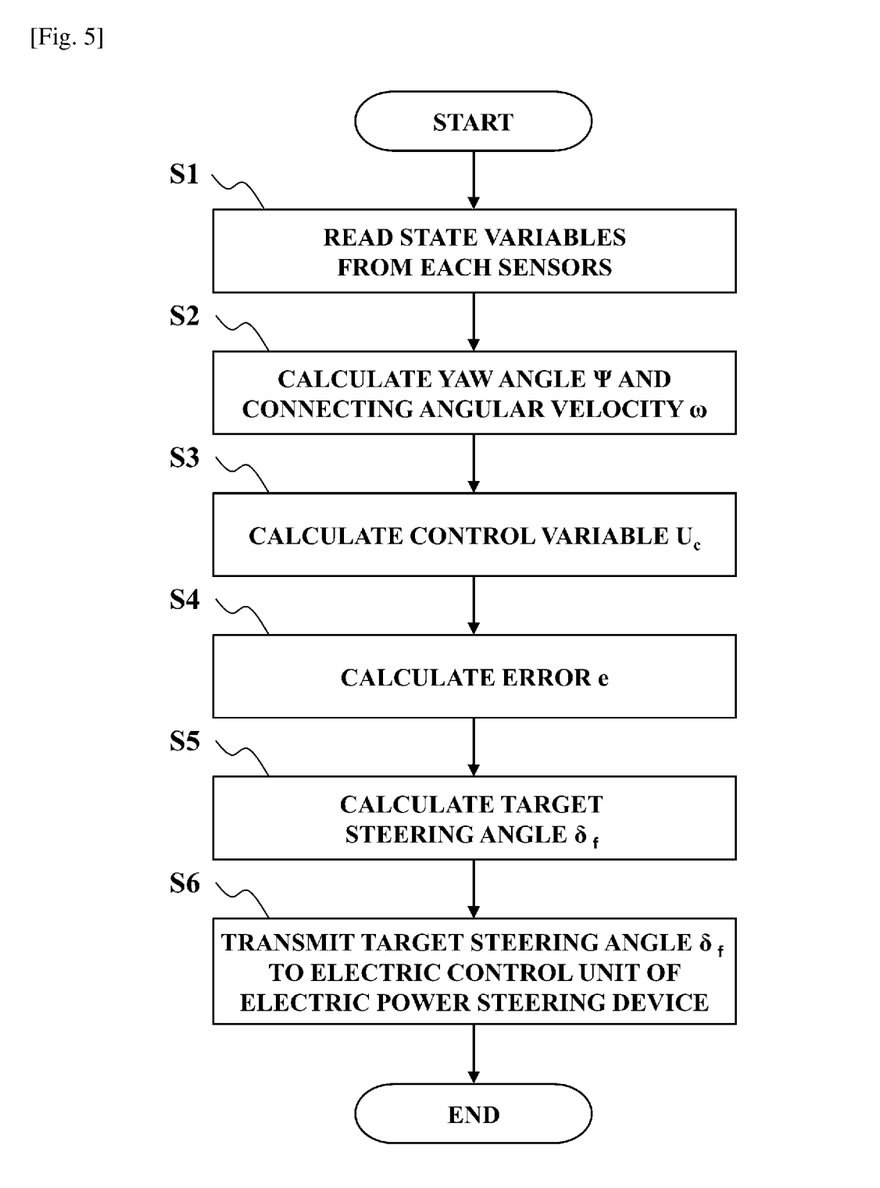
FIG. 5 is a flowchart of a process of an application program which implements the optimal lane keeping assistance process.

FIG. 5 illustrates an example of a lane keeping assistance process that is repeatedly executed by the processor 500A at predetermined time intervals according to the application program stored in the non-volatile memory 500B in response to the start-up of the electric control unit 500. When the processor 500A of the electric control unit 500 executes the lane keeping assistance process, the control block of the optimum lane keeping assistance process illustrated in FIG. 4 is implemented.

In step 1 (abbreviated as "S1" in FIG. 5; the same applies hereinafter), the processor 500A of the electric control unit 500 reads the state variable x(k) of the tractor 200 and the fifth wheel coupling 400 from each sensor via the input-output circuit 500D. Specifically, the processor 500A of the electric control unit 500 reads: the lateral displacement value y of the tractor 200 from the lateral displacement sensor 520; the yaw rate r of the tractor 200 from the yaw rate sensor 540; and the connecting angle $\theta$ of the fifth wheel coupling 400 from the connecting angle sensor 560.

In step 2, the processor 500A of the electric control unit 500 sequentially integrates the yaw rate r read from the yaw rate sensor 540 to calculate the yaw angle $\Psi$ of the tractor 200, and calculates the connecting angular velocity $\omega$ of the fifth wheel coupling 400 based on temporal changes of the connecting angle $\theta$ read from the connecting angle sensor 560. In a case in which a sensor capable of directly detecting the yaw angle $\Psi$ and the connecting angular velocity $\omega$ is provided, the process in step 2 can be omitted by reading the yaw angle $\Psi$ and the connecting angular velocity $\omega$ in step 1.

In step 3, the processor 500A of the electric control unit 500 calculates the control variable $u_c$ through the following process. That is, the processor 500A of the electric control unit 500 calculates Fx(k) by multiplying the lateral displacement value y, the yaw angle $\Psi$, the yaw rate r, the connecting angular velocity $\omega$ and the connecting angle $\theta$ as the state variable x(k) by the feedback gain F of the optimal control rule. Then, the processor 500A of the electric control unit 500 calculates the control variable $u_c = Y_d - Fx(k)$ by subtracting Fx(k) from the target lateral displacement value $Y_d$.

In step 4, the processor 500A of the electric control unit 500 calculates an error e indicating a deviation from the target lateral displacement value $Y_d$ through the following process. That is, the processor 500A of the electric control unit 500 multiplies the yaw angle $\Psi$ by the forward gazing distance L to calculate $L_p \Psi$, and adds the calculated value $(L_p \Psi)$ to the lateral displacement value y to calculate $(y + L_p \Psi)$. Then, the processor 500A of the electric control unit 500 subtracts $(y + L_p \Psi)$ from the control variable $u_c(Y_d - Fx(k))$ to calculate an error $e = u_c - (y + L_p \Psi) = Y_d - Fx(k) - y - L_p \Psi$.

In step 5, the processor 500A of the electric control unit 500 calculates the target steering angle $\delta_f$ in consideration of the characteristics of the driver by multiplying the error e by the constant $(G/(T_s+1))$ of the driver model of the first order lag system.

In step 6, the processor 500A of the electric control unit 500 transmits the target steering angle $\delta_f$ to the electric control unit 620 of the electric power steering device 600 through the communication circuit 500E. In this way, the electric control unit 620, that has received the target steering angle $\delta_f$, of the electric power steering device 600 performs feedback control of an actuator of the electric power steering device 600 so that an actual steering angle detected by a steering angle sensor (not shown) approaches the target steering angle $\delta_f$.

Therefore, in consideration of the feedback gain F of the optimal control rule, the front wheel 220 of the tractor 200 is steered based on the state variables of the tractor 200 and the fifth wheel coupling 400, and thus, for example, even if an abnormality such as a puncture occurs in one of the tires of the articulated vehicle 100, deviation of the tractor 200 from the lane ahead is avoided. Hereinafter, simulation results which verify such an effect are shown.

Figure 6:
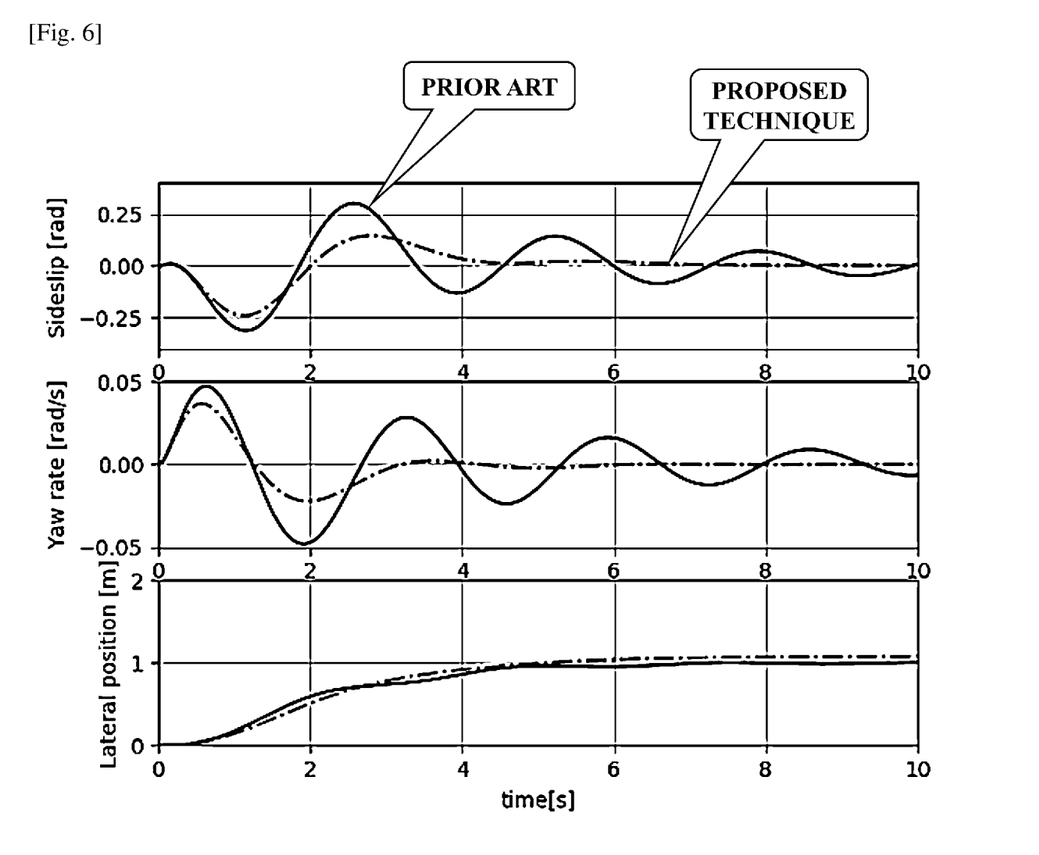
FIG. 6 is an explanatory view of simulation results which show time-sequential changes in lane change at a normal time.

FIG. 6 illustrates temporal changes in sideslip angle, yaw rate, and lateral displacement value when the articulated vehicle 100 makes a single lane change in a normal state in which no abnormality occurs in a tire. In the prior art, as shown by a solid line, the sideslip angle fluctuates by more than 0.25 [rad], the yaw rate fluctuates by at most 0.05 [rad/s], and the lateral displacement value somewhat fluctuates. On the other hand, in the technique proposed in the present embodiment, as shown by a dashed-dotted line, the maximum values of the sideslip angle and the yaw rate are small and converge early, and the lateral position is smoothly changed. Therefore, it can be understood that the stability of the articulated vehicle 100 is improved in a state in which no abnormality occurs in a tire.

Figure 7:
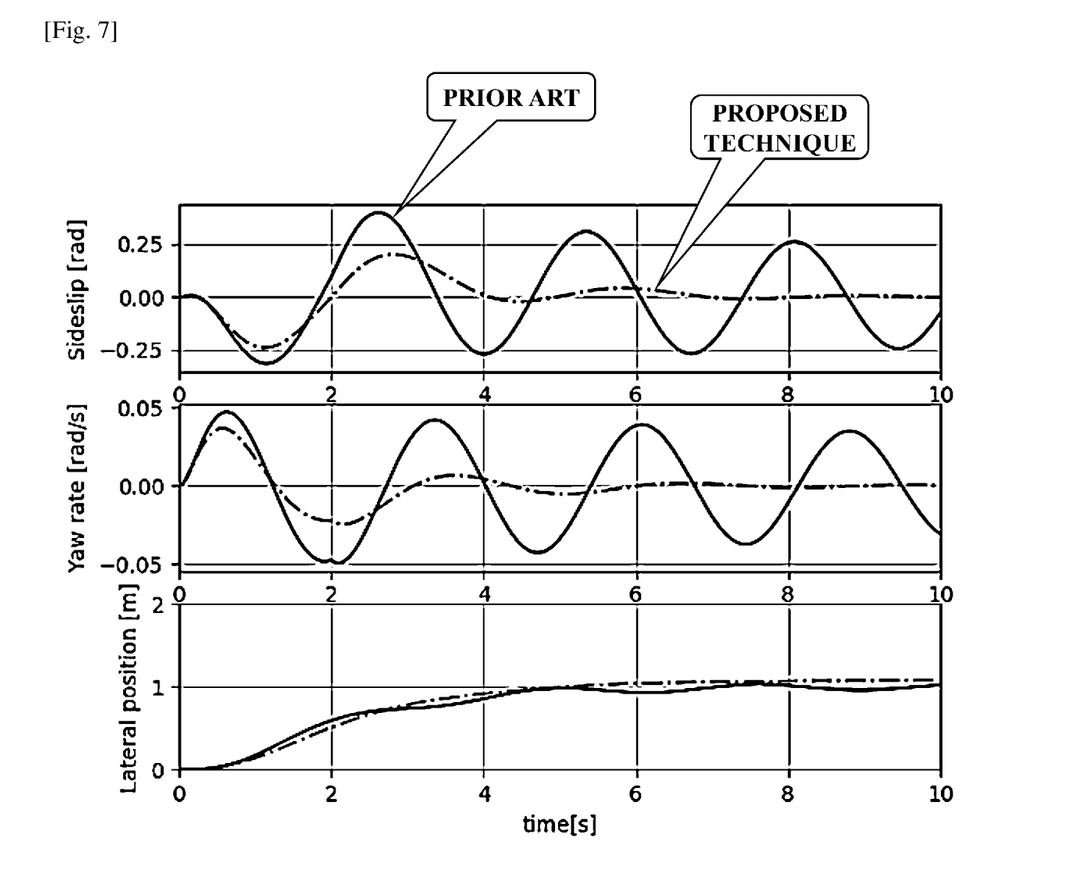
FIG. 7 is an explanatory view of simulation results which show time-sequential changes when an abnormality occurs in a tire of the trailer during lane change.

FIG. 7 illustrates temporal changes in sideslip angle, yaw rate, and lateral displacement value when the cornering power decreases by 30% due to an abnormality in a tire of the trailer 300 after 2 seconds from the articulated vehicle 100 starting single lane change. In the prior art, as shown by the solid line, fluctuations in the sideslip and the yaw rate are greater than those in the normal state, and the fluctuations thereof do not converge in a short time. Fluctuation in the lateral displacement value is greater than that in the normal state. On the other hand, in the technique proposed in the present embodiment, even if an abnormality occurs in a tire of the trailer 300, as shown by the dashed-dotted line, the maximum values of the sideslip angle and the yaw rate become smaller and converge, and similar to the normal state, the lateral position is smoothly changed. Therefore, even if an abnormality has occurred in a tire during the lane change and the cornering power is reduced, it can be understood that the stability of the articulated vehicle 100 is improved.

Figure 8:
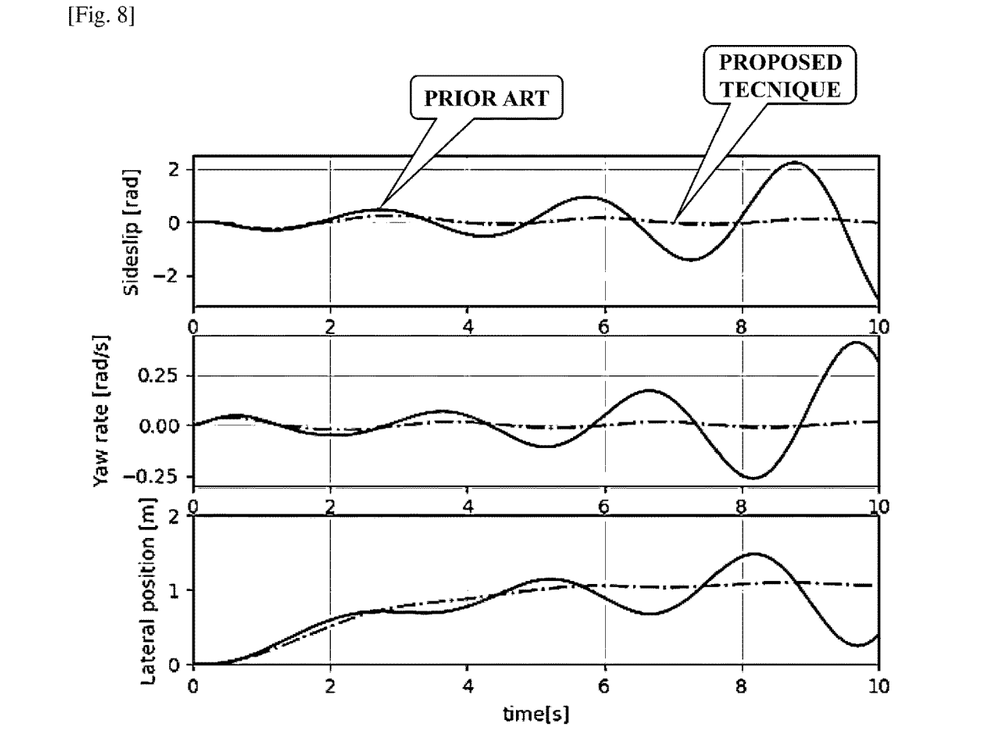
FIG. 8 is an explanatory view of simulation results which show time-sequential changes when a time constant of a driver model falls during lane change.

FIG. 8 illustrates temporal changes in sideslip angle, yaw rate, and lateral displacement value when the time constant $T_s$ (quick responsiveness) of the driver model decreases by 80% after 2 seconds from the articulated vehicle 100 starting the single lane change. In the prior art, as shown by the solid line, when the time constant $T_s$ of the driver model decreases, sideslip angle, yaw rate, and lateral position gradually increase and diverge as time passes, while fluctuating. On the other hand, in the technique proposed in the present embodiment, as shown by the dashed-dotted line, even if the time constant $T_s$ of the driver model decreases, sideslip angle, yaw rate, and lateral displacement value do not fluctuate too much and converge in a narrow range, as time passes. Therefore, it can be understood that the lane change can be stably continued even if the time constant $T_s$ of the driver model decreases during the lane change, and the stability of the articulated vehicle 100 is improved.

The reason the stability of the articulated vehicle 100 is improved in this way is that, as a result of analyzing a system eigenvalue, a characteristic root is near an imaginary axis in the prior art; however, in the technique proposed in the present embodiment, the characteristic roots are not around the imaginary axis.

Figure 9:
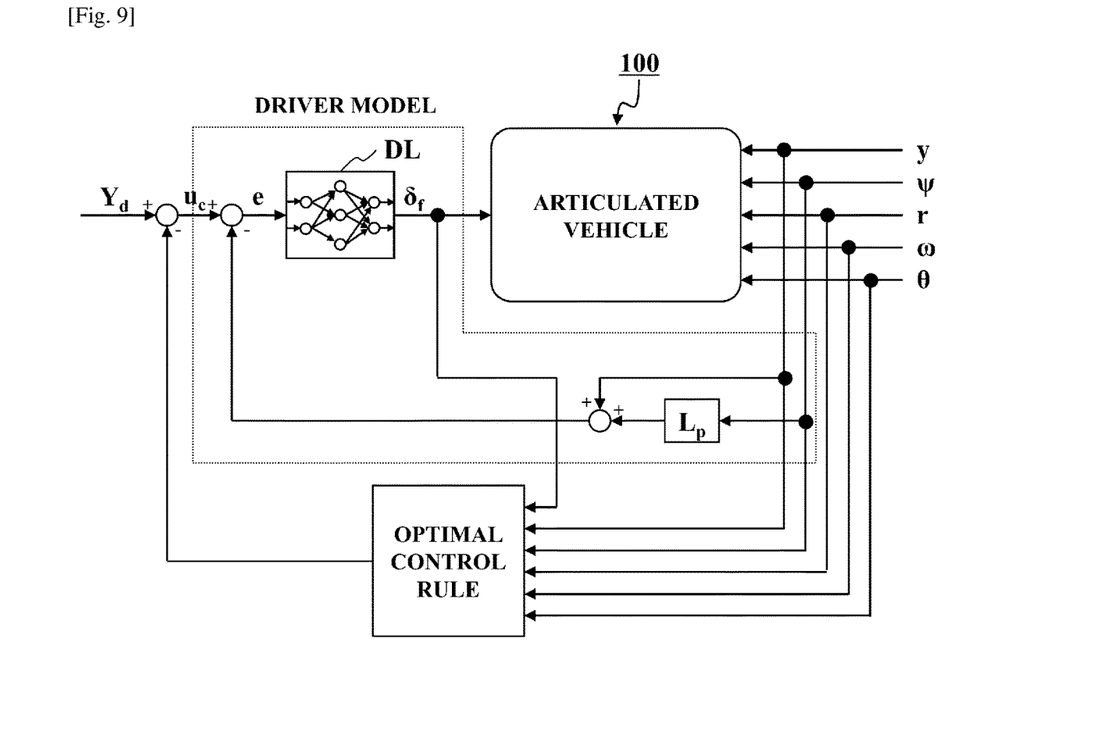
FIG. 9 is another control block view of the optimal lane keeping assistance process.

Regarding the above embodiment, as illustrated in FIG. 9, instead of the constant $(G/(T_s+1))$ of the driver model, the processor 500A of the electric control unit 500 can calculate the target steering angle $\delta_f$ by multiplying the error e by a constant obtained by a deep learning DL. In addition, the processor 500A of the electronic control unit 500 transmits an operation amount according to the control variable $u_c$ $(Y_d-Fx(k))$ to the electric control unit 620 of the electric power steering device 600 to assist the steering of the tractor 200.

The application program can be distributed in the market by being stored in a computer-readable recording medium, for example, an SD card or a USB memory. Furthermore, the application program can be stored in storage at a node connected to the Internet etc. and can be distributed from this node. In this case, storage of the node is taken as an example of a computer-readable storage medium.

One skilled in the art would readily understand that a new embodiment can be made by omitting a part of the technical idea of the various embodiments, freely combining parts of the technical idea of the various embodiments, and substituting a part of the technical idea of the various embodiments.

REFERENCE SIGNS LIST 100 articulated vehicle
200 tractor
300 trailer
400 fifth wheel coupling
500 electric control unit
520 lateral displacement sensor (first sensor)
540 yaw rate sensor (first sensor)
560 connecting angle sensor (second sensor)
600 electric power steering device
620 electric control unit

The invention claimed is:

1. An optimal lane keeping assistance device for an articulated vehicle, in which a tractor and a trailer are connected via a fifth wheel coupling, comprising:
a first sensor which detects a state variable of the tractor;
a second sensor which detects a state variable of the fifth wheel coupling; and
an electric control unit which incorporates a microcomputer;
wherein the electric control unit is configured to calculate a control variable using a target lateral displacement value and subtracting output signals from the first sensor and the second sensor taking into account a feedback gain of optimal control rule, to calculate a target steering angle of the tractor according to the calculated control variable and the output signal from the first sensor, and to assist steering of the tractor based on the calculated target steering angle, and
wherein the state variable of the tractor includes a lateral displacement value, a yaw angle, and a yaw rate.

2. The optimal lane keeping assistance device according to claim 1, wherein the electric control unit is configured to assist the steering of the tractor based on the calculated target steering angle, taking into account a driver model of a first order lag system.

3. The optimal lane keeping assistance device according to claim 1, wherein the electric control unit is configured to assist the steering of the tractor by sending the calculated target steering angle to an electric control unit of an electric power steering device.

4. The optimal lane keeping assistance device according to claim 1, wherein the state variable of the fifth wheel coupling includes a connecting angular velocity and a connecting angle.

5. The optimal lane keeping assistance device according to claim 1, wherein the articulated vehicle is a full trailer vehicle or a semi-trailer vehicle.

6. An optimal lane keeping assistance method for an articulated vehicle, in which a tractor and a trailer are connected via a fifth wheel coupling, the articulated vehicle including: a first sensor which detects a state variable of the tractor; a second sensor which detects a state variable of the fifth wheel coupling; and an electric control unit which incorporates a microcomputer,     wherein the electric control unit performs the following steps:

calculating a control variable using a target lateral displacement value and subtracting output signals from the first sensor and the second sensor taking into account a feedback gain of optimal control rule;

calculating a target steering angle of the tractor according to the calculated control variable and the signal output from the first sensor;

assisting steering of the tractor based on the calculated target steering angle,     wherein the state variable of the tractor includes a lateral displacement value, a yaw angle, a yaw rate.

7. The optimal lane keeping assistance method according to claim 6, wherein the step of assisting the steering of the tractor assist the steering of the tractor based on the calculated target steering angle, taking into account a driver model of a first order lag system.

8. The optimal lane keeping assistance method according to claim 6, wherein the step of assisting the steering of the tractor assists the steering of the tractor by sending the calculated target steering angle to an electric control unit of an electric power steering device.

9. The optimal lane keeping assistance method according to claim 6, wherein the state variable of the fifth wheel coupling includes a connecting angular velocity and a connecting angle.

10. The optimal lane keeping assistance method according to claim 6, wherein the articulated vehicle is a full trailer vehicle or a semi-trailer vehicle.

11. An articulated vehicle comprising the optimal lane keeping assistance device according to claim 1.

12. A non-transitory computer readable medium storing a computer program including a program code which executes the steps of the optimal lane keeping assistance method according to claim 6, when the computer program is executed on a computer.

* * * * *